(12) United States Patent
Behm et al.

(10) Patent No.: US 11,245,577 B2
(45) Date of Patent: Feb. 8, 2022

(54) TEMPLATE-BASED ONBOARDING OF INTERNET-CONNECTIBLE DEVICES

(71) Applicant: Amazon Technologies, Inc., Seattle, WA (US)

(72) Inventors: Bradley Jeffery Behm, Seattle, WA (US); Lomash Kumar, Redmond, WA (US); Jijo Raphael Jose, Kirkland, WA (US)

(73) Assignee: Amazon Technologies, Inc., Seattle, WA (US)

(*) Notice: Subject to any disclaimer, the term of this patent is extended or adjusted under 35 U.S.C. 154(b) by 54 days.

(21) Appl. No.: 16/584,838

(22) Filed: Sep. 26, 2019

(65) Prior Publication Data
US 2021/0099339 A1   Apr. 1, 2021

(51) Int. Cl.
*H04L 12/24* (2006.01)

(52) U.S. Cl.
CPC ........ *H04L 41/0806* (2013.01); *H04L 41/085* (2013.01); *H04L 41/0869* (2013.01); *H04L 41/12* (2013.01)

(58) Field of Classification Search
CPC ... H04L 41/12; H04L 41/085; H04L 41/0806; H04L 41/0869; H04L 45/02; H04L 12/24;
(Continued)

(56) References Cited

U.S. PATENT DOCUMENTS 8,857,705 B2   10/2014   Larson et al.
9,497,572 B2   11/2016   Britt et al.
(Continued)

FOREIGN PATENT DOCUMENTS

| CN | 102546324 | 7/2012 |
|----|-----------|--------|
| CN | 202720505 | 2/2013 |
| CN | 103580968 | 2/2014 |

OTHER PUBLICATIONS

Sabella D, Sukhomlinov V, Trang L, Kekki S, Paglierani P, Rossbach R, Li X, Fang Y, Druta D, Giust F, Cominardi L. Developing software for multi-access edge computing. ETSI white paper. Feb. 2019;20:1-38. (Year: 2019).*

(Continued)

*Primary Examiner* — James N Fiorillo
(74) *Attorney, Agent, or Firm* — Robert C. Kowert; Kowert, Hood, Munyon, Rankin & Goetzel, P.C.

(57) ABSTRACT

Methods, systems, and computer-readable media for template-based onboarding of internet-connectible devices are disclosed. A device onboarding service receives an onboarding request comprising a proof and context of identity (PCI) of an Internet-connectible device (ICD). The service determines an account associated with the ICD based at least in part on the onboarding request. The account is associated with an account policy in an onboarding template that is determined at least in part by an owner of the account. If the PCI is verified against one or more criteria of the onboarding template, then a device configuration is determined based at least in part on the onboarding template. The service sends the device configuration to the ICD, and the ICD's behavior is determined at least in part on the device configuration. The ICD uses the access credentials of the device configuration to communicate with an application in a cloud computing environment.

20 Claims, 10 Drawing Sheets

(58) Field of Classification Search
CPC ... H04L 63/062; H04L 63/102; H04L 8/0819;
H04L 29/06; H04W 4/70
USPC .......................................................... 709/220
See application file for complete search history.

(56) References Cited

U.S. PATENT DOCUMENTS

| | | | |
|---|---|---|---|
| 9,538,311 B2 | 1/2017 | Baum et al. | |
| 9,888,337 B1* | 2/2018 | Zalewski | H04W 76/14 |
| 9,913,143 B1* | 3/2018 | Roche | H04W 12/50 |
| 9,923,893 B2 | 3/2018 | Ameling et al. | |
| 10,057,125 B1 | 8/2018 | Roman et al. | |
| 10,089,610 B2 | 10/2018 | Chow et al. | |
| 10,284,684 B2 | 5/2019 | Tellado et al. | |
| 10,291,477 B1 | 5/2019 | Askar | |
| 10,348,866 B2 | 7/2019 | Yin et al. | |
| 10,353,480 B2 | 7/2019 | Roman et al. | |
| 10,356,092 B2 | 7/2019 | Mattela et al. | |
| 10,382,203 B1 | 8/2019 | Loladia et al. | |
| 10,382,919 B2 | 8/2019 | Karimli et al. | |
| 10,402,797 B2 | 9/2019 | Efroni et al. | |
| 10,411,898 B2 | 9/2019 | Liu et al. | |
| 10,416,991 B2 | 9/2019 | Bonar et al. | |
| 10,419,930 B2 | 9/2019 | Holland et al. | |
| 10,425,242 B2 | 9/2019 | Berdy et al. | |
| 2013/0094444 A1 | 4/2013 | Lai et al. | |
| 2016/0182499 A1* | 6/2016 | Sharaga | H04L 63/0823 713/156 |
| 2016/0210578 A1* | 7/2016 | Raleigh | H04W 4/50 |
| 2016/0308861 A1* | 10/2016 | Ameling | H04L 63/0876 |
| 2017/0187807 A1* | 6/2017 | Clernon | H04L 41/0806 |
| 2018/0234519 A1* | 8/2018 | Boyapalle | H04L 41/0806 |
| 2019/0018951 A1* | 1/2019 | James | H04L 61/3025 |
| 2019/0116087 A1* | 4/2019 | Hiller | H04L 67/12 |
| 2019/0140906 A1* | 5/2019 | Furuichi | H04L 41/12 |
| 2019/0158355 A1* | 5/2019 | Ramisetty | H04L 41/0806 |
| 2019/0190782 A1* | 6/2019 | Panje | H04L 67/34 |
| 2019/0222569 A1* | 7/2019 | Willis | H04W 12/069 |
| 2019/0230063 A1* | 7/2019 | McCready | H04W 12/03 |
| 2019/0296973 A1* | 9/2019 | Jeuk | H04L 41/0806 |
| 2019/0349426 A1* | 11/2019 | Smith | H04L 41/12 |
| 2019/0356542 A1* | 11/2019 | Chamarajnager | H04L 63/0823 |
| 2019/0373472 A1* | 12/2019 | Smith | H04L 9/3239 |
| 2020/0112612 A1* | 4/2020 | Chandaria | H04L 67/34 |
| 2020/0153697 A1* | 5/2020 | Turner | H04L 41/12 |
| 2020/0169460 A1* | 5/2020 | Bartlett | H04W 76/11 |
| 2020/0195545 A1* | 6/2020 | Chuang | H04L 43/50 |
| 2020/0213193 A1* | 7/2020 | Newell | H04L 41/04 |
| 2020/0221296 A1* | 7/2020 | Jiang | H04L 41/0806 |
| 2020/0259710 A1* | 8/2020 | Muniyan | G06F 16/2474 |
| 2020/0403871 A1* | 12/2020 | AbiEzzi | H04L 67/12 |
| 2021/0075890 A1* | 3/2021 | Raman | H04L 41/5054 |

OTHER PUBLICATIONS

Fan X, Chai Q, Xu L, Guo D. DIAM-IoT: A Decentralized Identity and Access Management Framework for Internet of Things. InProceedings of the 2nd ACM International Symposium on Blockchain and Secure Critical Infrastructure Oct. 6, 2020 (pp. 186-191). (Year: 2020).*
H. Gupta and P. C. van Oorschot, "Onboarding and Software Update Architecture for IoT Devices," 2019 17th International Conference on Privacy, Security and Trust (PST), 2019, pp. 1-11, doi: 10.1109/PST47121.2019.8949023 (Year: 2019).*
Jonathan Holdowsky, et al., "Inside the Internet of Things (IoT)", Deloitte University Press, Copyright 2015, pp. 1-54.
Ben Dickson, "How do you authenticate and connect billions of IoT devices", Retrieved from URL: https://bdtechtalks.com/2018/08/01/alex-momot-iot-security-blockchain-authentication/ on Dec. 4, 2018, pp. 1-6.
AWS, "AWS IoT Developer Guide", Copyright 2018, pp. 1-1227.
U.S. Appl. No. 16/255,128, filed Jan. 23, 2019, Lomash Kumar.
International Search Report and Written Opinion from PCT/US2020/050330, dated Dec. 11, 2020, pp. 1-11.

* cited by examiner

TEMPLATE-BASED ONBOARDING OF INTERNET-CONNECTIBLE DEVICES

BACKGROUND

In recent years, the number of types of smart Internet-connectable devices available, such as home appliances (washing machines, refrigerators, dishwashers, stoves/ovens etc.), digital assistant devices, smart sensors and the like has increased rapidly. Such devices may be referred to collectively as the "Internet of Things" or IoT, and applications built using such devices (such as an application that scans the contents of a smart refrigerator and produces a suggested grocery list, or automatically orders groceries) may be referred to as IoT applications. The Internet of Things encompasses a wide variety of domains. For example, as more and more automation is introduced into the transportation sector (e.g., in the form of semi-autonomous or fully-autonomous vehicles), even cars, trucks and other vehicles are also gradually beginning to rely on, or becoming part of, the Internet of Things.

In order to participate in the Internet of Things, an individual IoT device often needs to be properly connected to a back-end system in a process referred to as onboarding. If onboarding is successful, then the back-end system may receive data from the IoT device and send updates back to the device. Existing workflows for onboarding vary widely, e.g., according to the type of device, the manufacturer of the device, and so on. For example, different devices may identify themselves using different types of identity information, and different types of identity information may be verified using a variety of techniques. The variety of onboarding workflows creates additional complexity for installation of IoT devices.

Figure 1A:
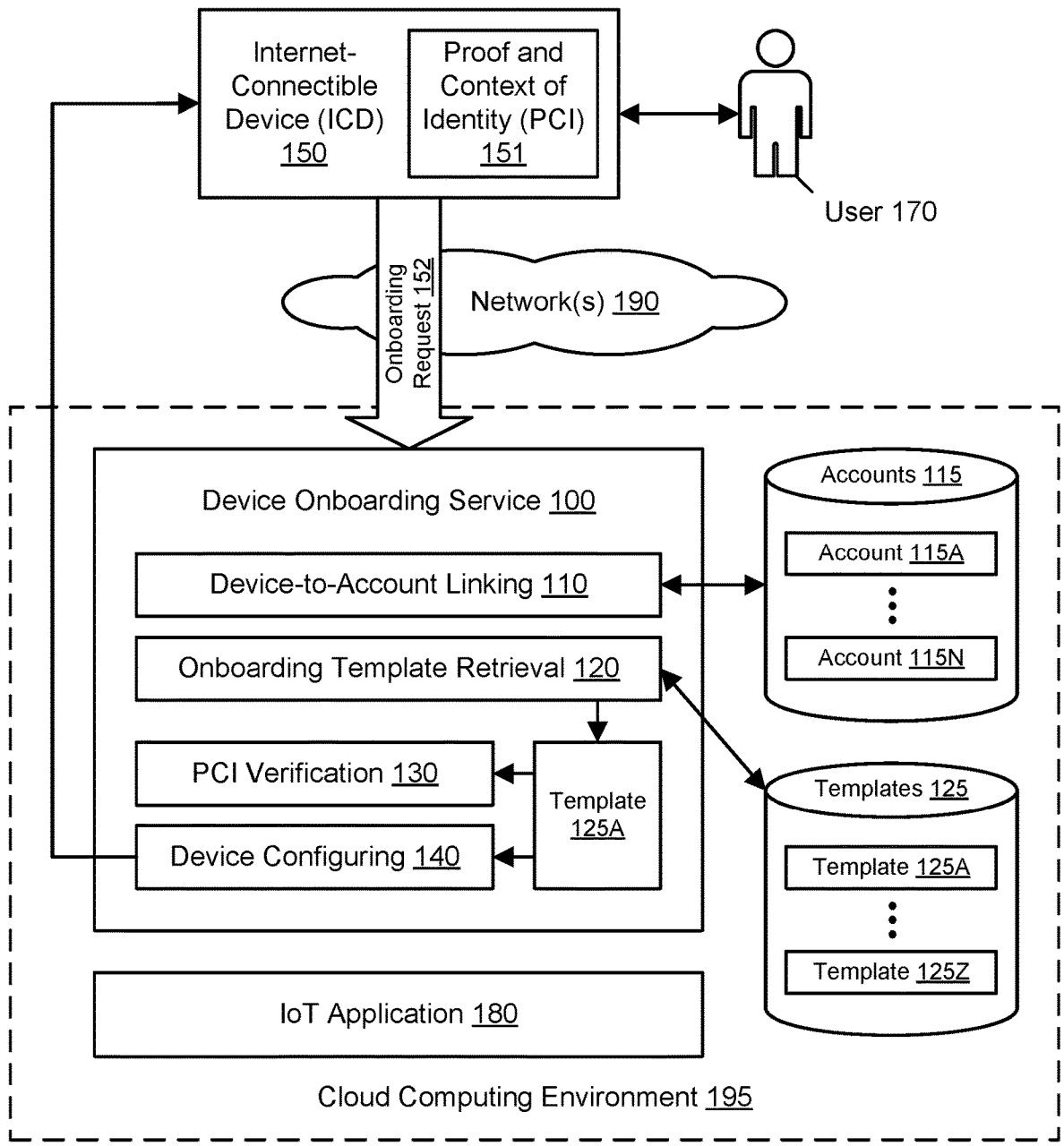
FIG. 1A illustrates an example system environment for template-based onboarding of Internet-connectible devices, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for template-based onboarding of Internet-connectible devices (ICDs) are described. ICDs may represent or be embedded in a variety of products, such as home automation devices, home appliances, manufacturing devices, automobiles, thermostats and other sensors, smart traffic lights, and so on. ICDs may include Internet of Things (IoT) devices in some embodiments, although the techniques described herein are not limited to any particular device categories or types. An ICD may also be referred to as a client device in terms of its relationship to a remote system. Many ICDs may make use of a connection (potentially a long-lived one) with a server of a remote service provider in order to stream data from the client device to the server and from the server to the client device whenever data needs to be transmitted. The term "onboarding" may refer to the process of creating such a connection. Using prior approaches, individual devices or individual device manufacturers had differing workflows and applications for onboarding their devices. For example, a smart thermostat from one vendor might require a different application or set of steps than a smart thermostat from another vendor to establish the identity of the device, give the device access to a local network, and configure the device so that it performs as expected in its particular context. The installation of such devices may be complicated by device-to-device or vendor-to-vendor onboarding differences.

Using techniques described herein, Internet-connectable devices (ICDs) may be onboarded to a remote system (e.g., one or more applications, servers, or services hosted in the cloud) using a template or other structured document. A particular template may be associated with a particular account with the remote system. A template may represent a set of directives and/or a set of conditions for performing onboarding tasks for devices associated with a particular account. A template may be defined (at least in part) by an owner of that account or by an administrator authorized by an account owner. Using the directives and/or conditions in a relevant template, a device onboarding service or other cloud-based system may associate a device with a system group such as a user account, verify the identity of the device, generate a configuration for the device (including access credentials for the remote system), and/or perform other tasks to facilitate interaction between the cloud (e.g., an application in the cloud) and the device. For example, two smart thermostats from different vendors may use different onboarding templates but the same installation application installed on the mobile device of an installer of the devices. The use of onboarding templates as described herein may enable the creation of connections between various types of client devices and remote systems and the configuration of client devices in a simplified and/or standardized manner.

As one skilled in the art will appreciate in light of this disclosure, embodiments may be capable of achieving certain technical advantages, including some or all of the following: (1) reducing the latency and complexity of onboarding ICDs to a remote system by using standardized templates and a single onboarding application to simplify the onboarding process; (2) enhancing the security of onboarding ICDs to a remote system by using standardized templates that are usable to perform verification of device identities and contexts; (3) improving the performance of IoT/ICD devices and applications by using standardized templates that are usable to configure the devices and applications; and so on.

Figure 1B:
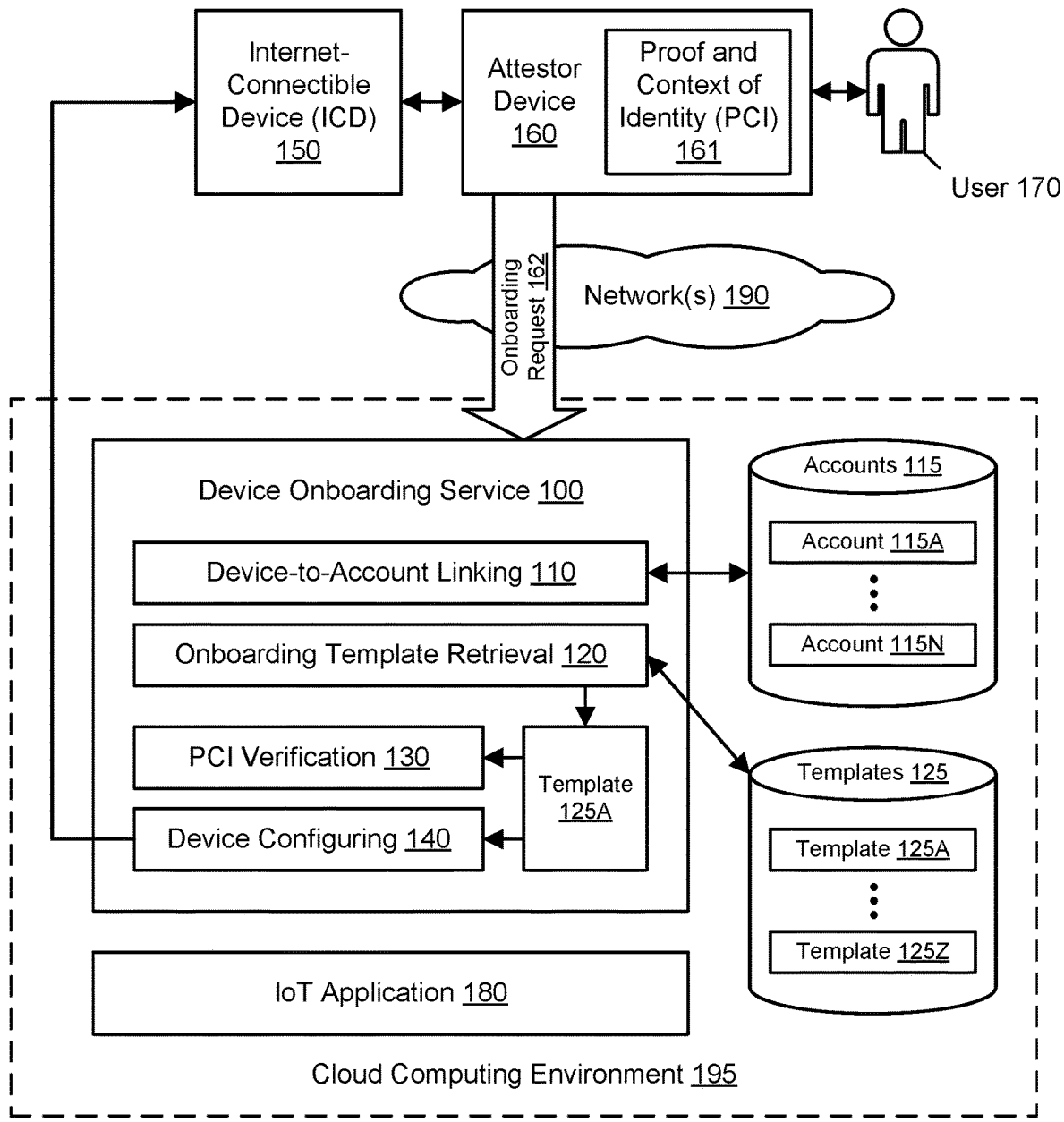
FIG. 1B illustrates further aspects of the example system environment for template-based onboarding of Internet-connectible devices, including an attestor, according to some embodiments.

FIG. 1A and FIG. 1B illustrate an example system environment for template-based onboarding of Internet-connectible devices, according to some embodiments. A device onboarding service 100 may allow or deny onboarding of devices based on pre-defined rules, policies, conditions, and/or other criteria. Onboarding may result in a connection between a device (such as Internet-connectible device 150) and one or more cloud-based or remote applications or systems (such as Internet of Things application 180). The device onboarding service 100 and IoT application 180 may be implemented in the cloud, e.g., in one or more cloud computing environments 195 that may be geographically remote from the ICD 150. The connection between an ICD 150 and an IoT application 180 may be long-lasting such that the device and the remote application may send data to each other over relatively long durations (e.g., months, years, etc.) without necessarily needing to repeat the onboarding process. For example, a smart thermostat, once onboarded, may automatically send temperature updates to a remote system hosted in the cloud over a period of months or years. The rules, policies, conditions, and/or criteria may be determined or defined (at least in part) by customers. Customers may include vendors of ICDs and other entities that take responsibility for the interaction between ICDs and remote applications. The responsibility taken by a customer may include financial responsibility, such that a cloud-based entity may assess fees to the customer for interactions between the ICD and the cloud and/or for cloud resources used by such interactions. Customers may typically include individuals or organizations that manage IoT applications (such as application 180) and not necessarily end users of ICDs or individual installers (technicians) of ICDs (such as user 170).

In some embodiments, the rules, policies, conditions, and/or criteria may be represented in onboarding templates 125. Onboarding templates 125 may represent structured documents that express directives for onboarding of ICDs. A particular onboarding template such as template 125A may describe the conditions by which an ICD (such as ICD 150) can identify itself to a system (e.g., the service 100), associate itself with a system group such as a user account, and receive the configuration necessary to interact with a local network (e.g., using WiFi credentials) as well as a component in the cloud computing environment 195 (e.g., the IoT application 180) and potentially with other devices. In one embodiment, a template may include information related to (e.g., defining) one or more of the following elements: proof and context of identity, account policy, and credentials/configuration. An onboarding template for a given account may be determined, generated, or otherwise provided to the service 100 by an owner of the account or by an administrator authorized by an account owner.

Proof and context of identity (PCI) may relate to a claim of identity that a device can make. PCI may sometimes include hardware-based information (e.g., using hardware-backed cryptography). PCI may be based on the proximity of the device to another nearby device, e.g., an attestor 160 such as an onboarding device, mobile device, or local hub. The context may relate to the specific location of a device, e.g., at a particular address, in a particular room, and so on. The context may include the MAC address of the device, the Bluetooth ID of the device, a GPS location of the device or attestor, and so on. Elements of the PCI may often be provided by an installer or technician (e.g., user 170) or by the attestor device 160. The form of the PCI for a given device may vary from device to device, from vendor to vendor, and so on. For example, some devices may supply hardware-based proof of identity, while other devices may rely on information provided by an installer or attestor device. Using the onboarding templates 125 and device onboarding service 100, different forms of PCI may be used to verify the identity of ICDs and permit or deny onboarding requests for those devices with the same general onboarding workflow and/or the same onboarding application. In some embodiments, the onboarding process from the perspective of an installer (e.g., user 170) may be similar for different devices.

As shown in FIG. 1A, the PCI 151 may be located on the device 150 itself, e.g., as encoded in the device's hardware and/or entered into the device by a user 170. To initiate onboarding, the device 150 may send an onboarding request 152 to the device onboarding service 100 in the cloud 195. The request 152 may be sent over one or more network(s) 190 connecting the two components, e.g., to an address known to the device 150. As shown in FIG. 1A, the device 150 may already have access to the network(s) 190, e.g., via WiFi credentials entered by the user 170. The PCI 151 may be included in the onboarding request 152 or may be provided in a subsequent bundle of information sent by the device 150. An identifier of the specific onboarding template to use for the ICD 150 may be included in the onboarding request 152 or may be provided in a subsequent bundle of information sent by the device 150. The template may be selected by the user 170 or may instead be included in initial settings for the device 150.

As shown in FIG. 1B, the PCI 161 may be bundled up and signed by an attestor device 160. The attestor 160 may represent an intermediate device (e.g., a mobile device operated by an installer) that has access to the network(s) 190 and can attest for the proof of identity of the device 150. In one embodiment, the attestor 160 may obtain one portion of the PCI 161 from the device 150 itself and may determine another portion of the PCI on its own (or with input from the user 170). To initiate onboarding, the attestor device 160 may send an onboarding request 162 to the device onboarding service 100 in the cloud 195. The request 162 may be sent over one or more network(s) 190 connecting the two components, e.g., to an address known to the attestor device 160. As shown in FIG. 1B, the ICD 150 may not have access to the network(s) 190 prior to onboarding but may communicate with the attestor 160, e.g., over a Bluetooth connection or other local channel. The PCI 161 may be included in the onboarding request 152 or may be provided in a subsequent bundle of information sent by the attestor device 160. An identifier of the specific onboarding template to use for the ICD 150 may be included in the onboarding request 152 or may be provided in a subsequent bundle of information sent by the device 150. The template may be selected by the user 170, e.g., using an onboarding application installed on the attestor device 160.

The service 100 may receive the onboarding request and begin the process of using an appropriate onboarding template to attempt onboarding of the device 150. The service 100 may include a component 110 for device-to-account linking that identifies a user account with which the device 150 should be associated. The service 100 may include or have access to information describing a set of accounts 115 with the cloud computing environment 195 or with an individual component (e.g., the application 180). For example, the accounts 115 may include account 115A through account 115N. The selected account (e.g., account 115A) may be determined deterministically, e.g., based (at least in part) on the onboarding template ID, PCI, and/or other information received with the onboarding request. As discussed above, the user account may be associated with a particular customer, such as a vendor of ICDs or another entity that takes responsibility for the interaction between ICDs and a remote application 180. The service 100 may determine the account based (at least in part) on information (provided by the ICD or by the attestor) that is usable to identify the account, e.g., an account identifier or information that can map the device to an account identifier. In some embodiments, the service 100 may determine the account based (at least in part) on information received from the device 150 or attestor 160, such as a template ID linked to an account ID or an account ID itself. In some embodiments, the service 100 may determine the account without receiving an account ID from the device 150 or attestor 160, e.g., based (at least in part) on the PCI and/or the template ID.

The selected user account may have one or more account policies that are reflected in one or more onboarding templates. The service 100 may include a component 120 for onboarding template retrieval that identifies an onboarding template (e.g., template 125A) with which the device 150 should be associated, e.g., based on the template ID received with the onboarding request. The service 100 may include or have access to a set of templates 125. For example, the templates 125 may include template 125A through template 125N. Templates 125 may be identified by template IDs as well as customer-defined names. Templates 125 may be versioned such that each edit may create a new version. Templates 125 may be created or defined (at least in part) by account owners (customers) or designated administrators, and individual templates 125 may be specific to particular customer accounts 115. The selected template 125A may include an account policy that describes the types or forms of PCI that can be used for onboarding of devices. The account policy may also describe the criteria or conditions under which devices may be onboarded.

In some embodiments, the service 100 may use the appropriate template 125A to verify the identity of the device 150. The service 100 may include a component 130 for PCI verification. The PCI verification 130 may determine whether the provided PCI 151 meets the expected form(s) of PCI defined in the template 125A. The PCI verification 130 may also verify the identity of the device 150 using the PCI. In verifying the device identity, the PCI verification 130 may use techniques that are specific to the form of the PCI. For example, if the PCI includes hardware-based identity information expressed according to the standards of a particular hardware vendor, then that vendor's verification technique may be used for identity verification. The templates 125 may be flexible enough to encompass a wide variety of industry standards for identity verification. If the form of the PCI fails to satisfy the directives of the template 125A (e.g., the account policy), then the onboarding request may be rejected. If the identity verification itself fails, then the onboarding request may be rejected. A failed onboarding attempt may be logged, e.g., with a description of the failure, an identifier of the account, information identifying the device (e.g., the provided PCI), a timestamp, and/or other information usable to perform a security review. Otherwise, the onboarding process may continue.

In some embodiments, the service 100 may use the appropriate template 125A to configure the device 150. The service 100 may include a component 140 for device configuring. The device configuring component 140 may determine or generate a device configuration (e.g., device configuration information) that the device 150 can use to connect to the IoT application 180. The device configuration information may include access credentials for accessing a WiFi network or other local network in the vicinity of the device 150. The device configuration information may include access credentials for accessing elements of the cloud 195, e.g., the IoT application 180. The device configuration information may include an endpoint at which the device can access the application 180, e.g., a uniform resource locator (URL) or other address. The device configuration information may be sent by the service 100 to the device 150 if the device is already connected to the network (s) 190 or otherwise to the attestor 160, which may in turn provide the device configuration information to the device 150 via Bluetooth or another local channel.

In some embodiments, the various functions performed by the service 100 may be repeated across multiple rounds, e.g., to bootstrap the local network access (e.g., by supplying WiFi credentials) and then create a connection between the device 150 and the application 180. In some embodiments, the device 150 may validate the account policy to ensure that it matches the device's expectations. For example, a smart home device may check that it is only accepting instructions from an account associated with its vendor by verifying the server certification.

Figure 2:
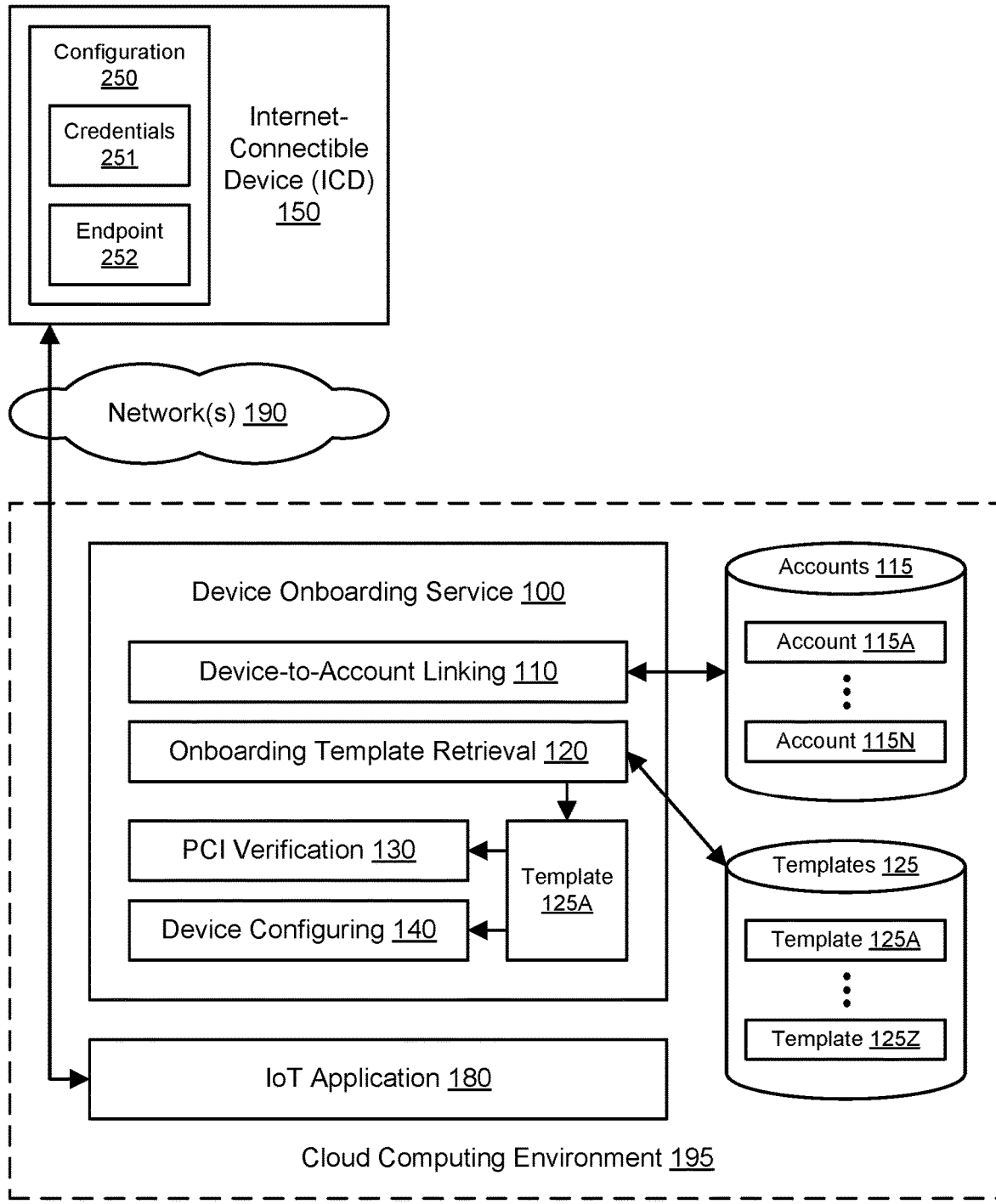
FIG. 2 illustrates further aspects of the example system environment for template-based onboarding of Internet-connectible devices, including a connection between an Internet-connectible device and an Internet of Things application, according to some embodiments.

FIG. 2 illustrates further aspects of the example system environment for template-based onboarding of Internet-connectible devices, including a connection between an Internet-connectible device and an Internet of Things application, according to some embodiments. As discussed above, the device configuration information 250 may include access credentials 251 as well as an endpoint 252 at which the device can access the application 180. The device configuration information 250 may include an arbitrary map of customer-defined key-value pairs. Using this configuration information 250, the ICD 150 and the cloud-based IoT application 180 may use a long-standing connection to exchange information. For example, the ICD 150 may supply regular measurements over time, and the application 180 may supply occasional updates to affect the functionality of the device. If the attestor 160 was used to initiate onboarding, then the attestor may be bypassed by this long-standing connection between the device 150 and the application 180.

The device configuration 250 may influence the behavior of the device 150, such that the device may perform one or more actions according to information specified or indicated in the device configuration. The behavior of the device may include the device attempting to connect to a particular endpoint in the cloud according to an address specified in the device configuration. The behavior of the device may include the device supplying access credentials to an endpoint in the cloud according to credentials specified in the device configuration. The behavior of the device may include the device collecting data according to the device configuration, e.g., according to a frequency or schedule indicated in the device configuration, in a format indicated in the device configuration, or after receiving speech input representing a "wake word" specified in the device configuration for a voice-enabled device that is configured to stream speech input to the cloud. The behavior of the device may include the device sending information (e.g., data collected by a sensor associated with the device) to an endpoint in the cloud according to the device configuration, e.g., to an address specified in the device configuration and with a frequency indicated in the device configuration. The behavior of the device may include the device receiving information (e.g., modifications to the configuration information) from an endpoint in the cloud and verifying the source of the information according to the device configuration.

Figure 7:
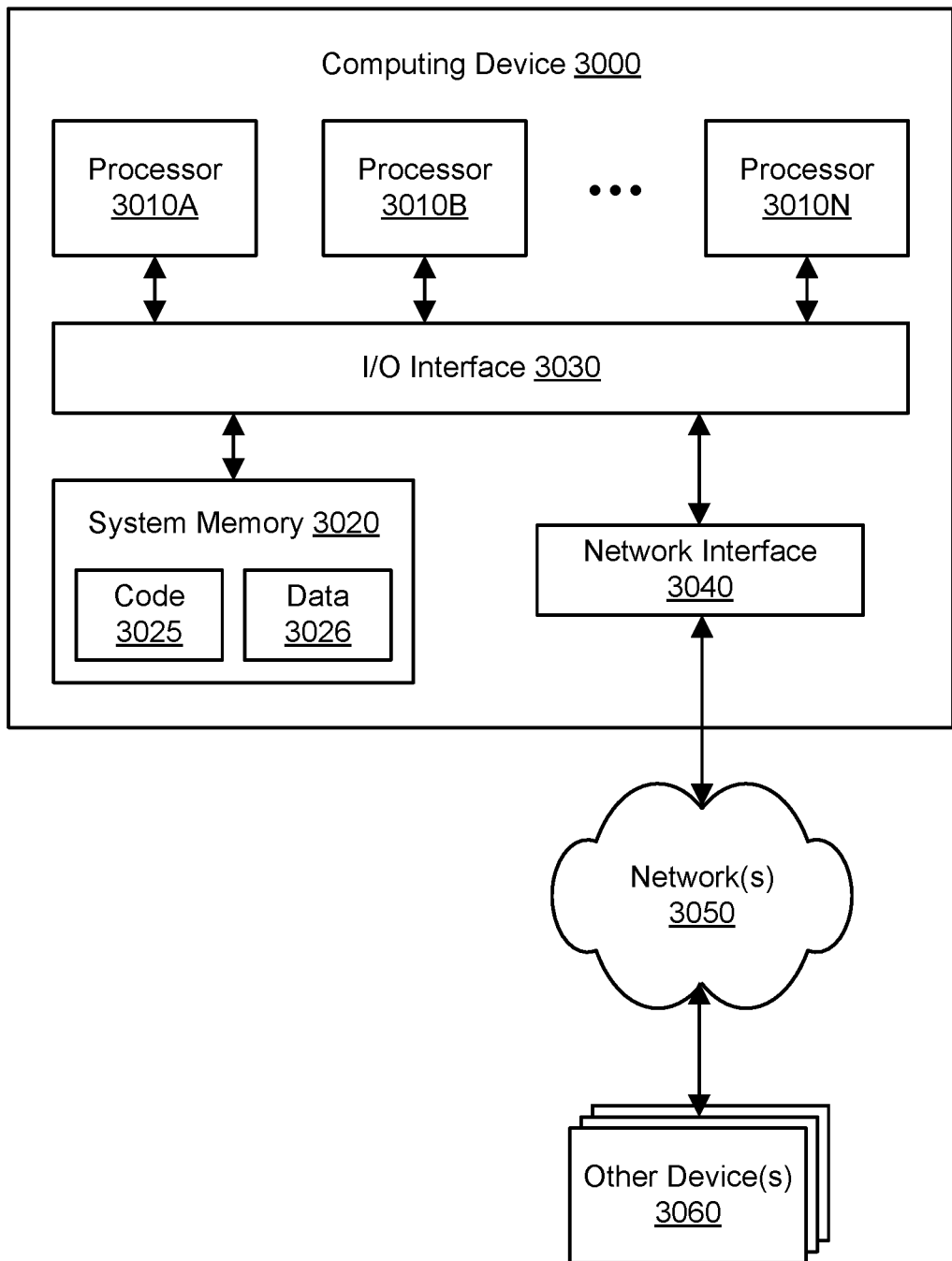
FIG. 7 illustrates an example computing device that may be used in some embodiments.

The device onboarding service 100 may include one or more computing devices, any of which may be implemented by the example computing device 3000 illustrated in FIG. 7. In various embodiments, the functionality of the different services, components, and/or modules of the device onboarding service 100 may be provided by the same computing device or by different computing devices. If any of the various components are implemented using different computing devices, then the respective computing devices may be communicatively coupled, e.g., via a network. Each of the components of the device onboarding service 100 may represent any combination of software and hardware usable to perform their respective functions, as discussed as follows. Functions implemented by the device onboarding service 100 may be performed automatically, e.g., without a need for user initiation or user intervention after an initial configuration stage, and programmatically, e.g., by execution of program instructions on at least one computing device. In one embodiment, aspects of the device onboarding service 100 may be performed repeatedly over time. The device onboarding service 100 may include additional components not shown, fewer components than shown, or different combinations, configurations, or quantities of the components shown. In various embodiments, the functionality described herein for the device onboarding service 100 may be implemented as a service that collaborates with other services in a service-oriented architecture or instead as another type of system or back-end component. The service 100 may be implemented using one or more service instances, each of which may include the functionality described with respect to FIG. 1A and FIG. 1B.

In at least some embodiments, an Internet-connectable device (ICD) such as ICD 150 may comprise one or more processors and a memory. The memory may store executable instructions that when executed on the one or more processors cause the one or more processors to perform operations such as connecting to a local network, communicating with a network endpoint (e.g., an application hosted in the cloud), and so on. In some embodiments, a set of additional executable instructions for the ICD (e.g., comprising firmware or software) may be obtained or downloaded from a network endpoint. As a result of the execution of the additional instructions, the ICD may in various embodiments attain a desired device state in which one or more operations associated with an application may be performed by the ICD. Note that the resource capabilities of ICDs may vary in different embodiments: some ICDs may have very limited processing power and very limited memory, while others may be equipped with high-end CPUs (central processing units) or processing cores and much larger memories.

The device onboarding service 100 may communicate with other components (e.g., ICDs and attestors) via one or more networks 190. In various embodiments, the network(s) 190 may encompass any suitable combination of networking hardware and protocols necessary to establish network-based communications between two components. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, two services may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between a first component and the Internet as well as between the Internet and a second component. In some embodiments, components may communicate with one another using a private network rather than the public Internet.

In one embodiment, aspects of the device onboarding service 100 and/or application 180 may be implemented using resources of a provider network or other cloud computing environment. A provider network may represent a network set up by an entity such as a business or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network. In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

In at least some embodiments, applications involving the use of ICDs such as smart appliances, smart sensors, and the like may be implemented using the resources of one or more network-accessible services of a provider network or other cloud computing environment 195. One or more computing services of the provider network, such as a virtualized computing service may, for example, be used to host the back-end application logic, while storage services of the provider network may be used to store data generated or collected at the ICDs. In at least one embodiment, a provider network may comprise an IoT application management service, including for example message brokers that enable efficient communication among potentially large numbers of ICDs of an application and/or between the ICDs and back-end application servers.

Figure 3:
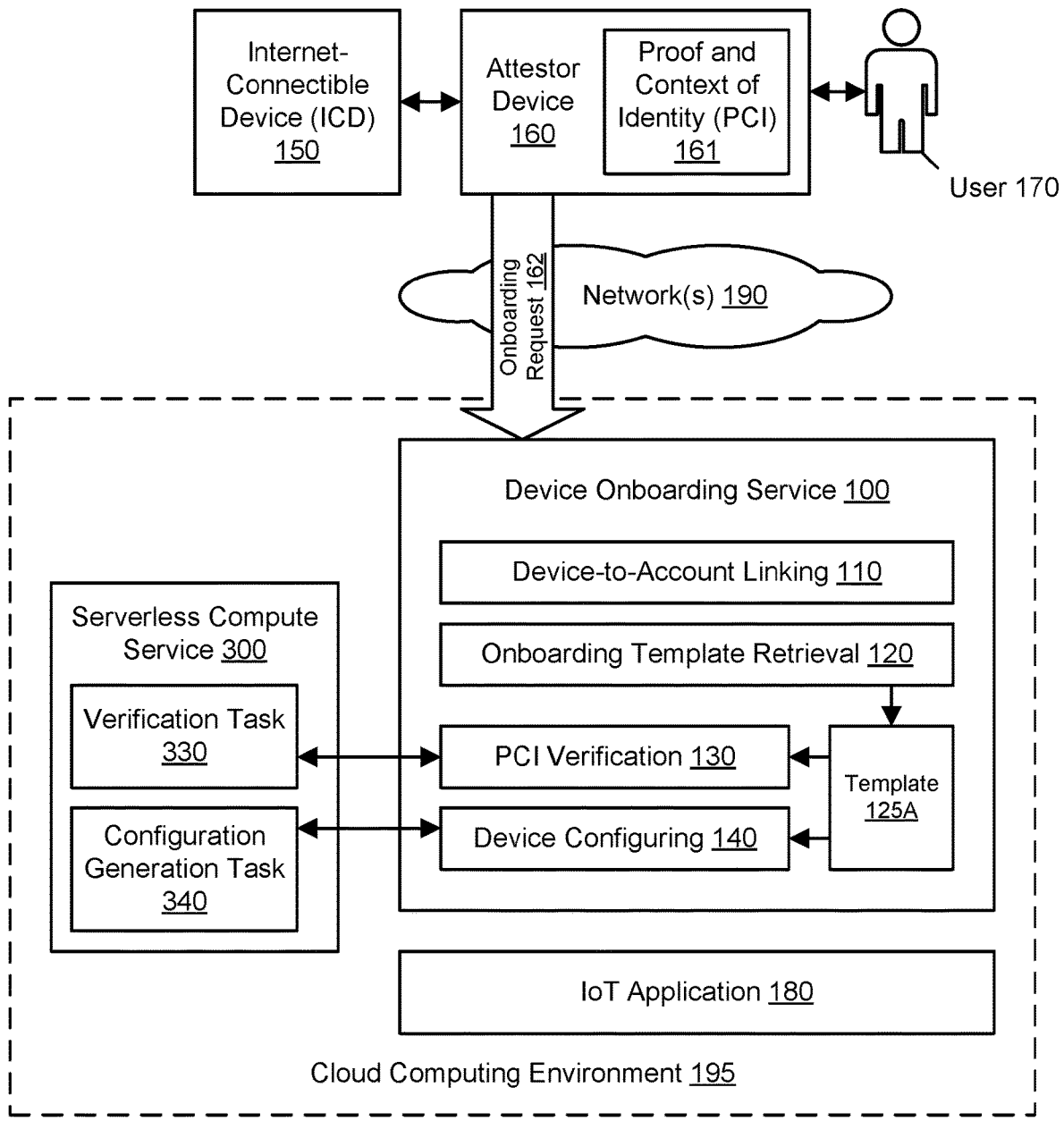
FIG. 3 illustrates further aspects of the example system environment for template-based onboarding of Internet-connectible devices, including the use of a compute service to perform tasks for verification and generating a device configuration, according to some embodiments.

FIG. 3 illustrates further aspects of the example system environment for template-based onboarding of Internet-connectible devices, including the use of a compute service to perform tasks for verification and generating a device configuration, according to some embodiments. In some embodiments, the PCI verification 130 and/or device configuring 140 may be implemented using external entities that perform tasks. For example, a serverless compute service 300 may perform functions indicated by the device onboarding service 100. In one embodiment, the PCI verification 130 may be performed by executing a verification task 330 using the serverless compute service 300. In one embodiment, the device configuring may be performed by executing a configuration generation task 340 using the serverless compute service 300. The tasks 330 and 340 may represent executable program code or high-level programming instructions that can be implemented by the compute service 300 using computing resources managed by the compute service and not provisioned by the device onboarding service 100. The tasks 330 and/or 340 may be indicated in the appropriate template 125A. The tasks 330 and/or 340 may be owned and/or operated by a third party that is distinct from the entity that manages the cloud computing environment 195. For example, the verification task 330 may be developed and managed by a vendor of a hardware element of the ICD that is usable to verify the ICD in a secure manner. By utilizing the external service 300 or other third-party compute environment to perform tasks, the template-based device onboarding may be extensible to a variety of verification and/or configuration techniques.

Figure 4:
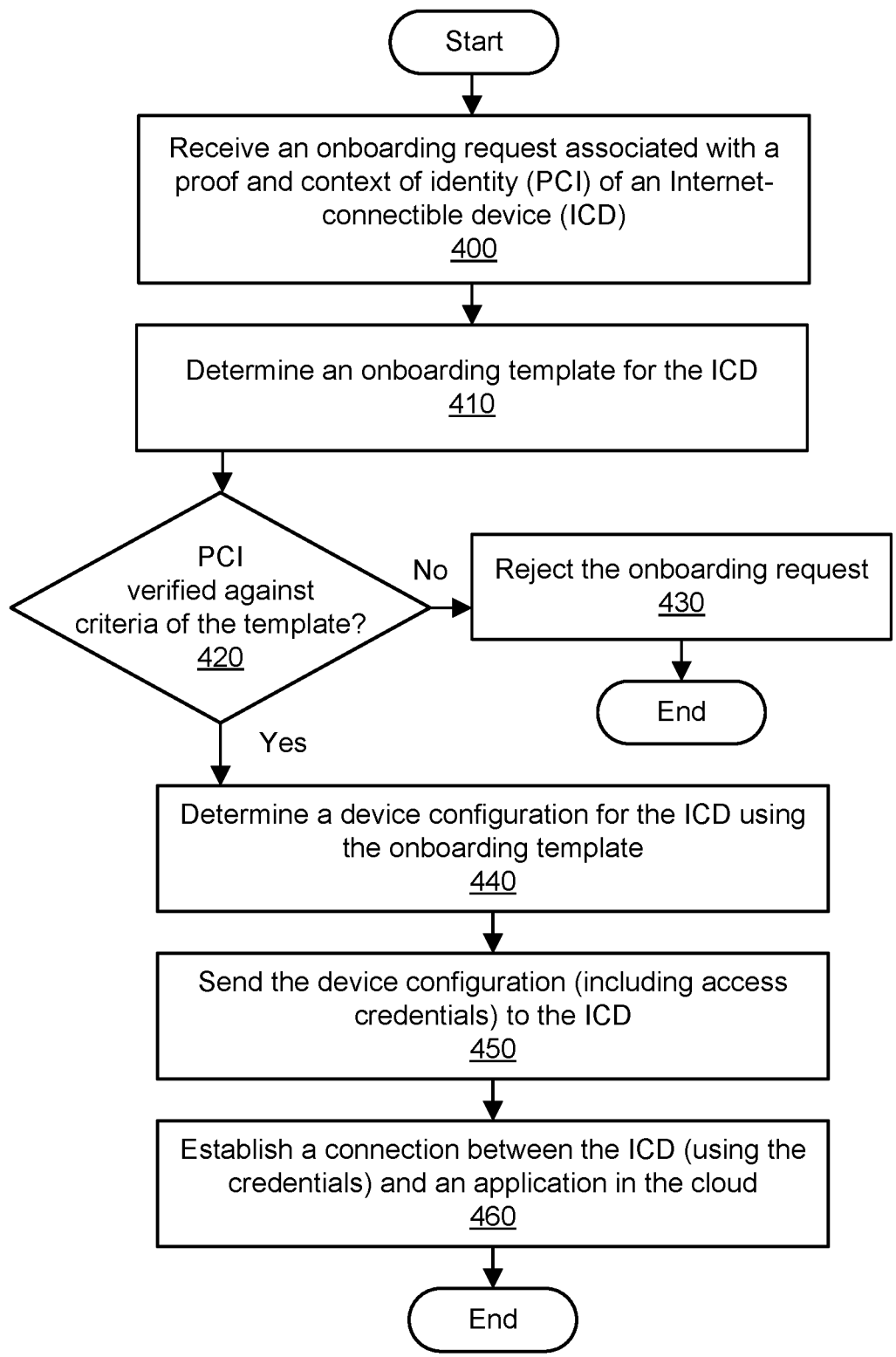
FIG. 4 is a flowchart illustrating a method for template-based onboarding of Internet-connectible devices, according to some embodiments.

FIG. 4 is a flowchart illustrating a method for template-based onboarding of Internet-connectible devices, according to some embodiments. As shown in 400, an onboarding request may be received, e.g., by a device onboarding service from an Internet-connectible device (ICD) or an attestor device (e.g., a smartphone, tablet, a dedicated onboarding device, and so on). The request may include or be associated with proof and context of identity (PCI) information. The PCI may relate to a claim of identity that a device can make as well as contextual information (e.g., about the location of the device). Elements of the PCI may often be provided by an installer or technician or by an attestor device.

As shown in 410, the method may determine an onboarding template for the ICD. The onboarding template may be determined based (at least in part) on a template ID supplied with the onboarding request. In one embodiment, an account may be determined deterministically for the ICD, e.g., based (at least in part) on the template ID or other information received with the onboarding request. The account may be associated with a particular customer, such as a vendor of ICDs or another entity that takes responsibility for the interaction between ICDs and a remote application. The onboarding template may represent a structured document that expresses directives for onboarding of ICDs. A template may describe the conditions by which the ICD can identify itself to a system (e.g., the device onboarding service), associate itself with a system group such as a user account, and receive the configuration necessary to interact with a local network (e.g., using WiFi credentials) as well as an IoT application or other cloud-based component. In one embodiment, a template may include information related to (e.g., defining) one or more of the following elements: proof and context of identity, account policy, and credentials/configuration.

As shown in 420, the method may determine whether the PCI has been verified against any criteria indicated in the onboarding template. The verification may include checking that the form of the supplied PCI meets the expected form of PCI as expressed in the template (or account policy). The verification may also include checking that the content of the supplied PCI is verified, e.g., using a verification technique expressed in the template (or account policy). As shown in 430, if the form or content of the PCI cannot be verified, then the onboarding request may be rejected.

As shown in 440, if both the form and content of the PCI are verified, then the method may proceed to determine a device configuration for the ICD using the onboarding template. The device configuration may include access credentials for a network and/or an Internet of Things (IoT) application hosted in the cloud. The access credentials and endpoint for the IoT application may be indicated in the onboarding template. As shown in 450, the device configuration may be sent to the device itself. The configuration may be sent directly to the device if the device is already on the local network (e.g., using WiFi credentials entered by a user or supplied during a prior round of onboarding) or indirectly via an attestor device.

As shown in 460, a connection may be established between the device and the IoT application. The device may use the provided configuration (including the credentials) to contact the IoT application and establish the connection. The connection between an ICD and an IoT application may be long-lasting such that the device and the remote application may send data to each other over relatively long durations (e.g., months, years, etc.) without necessarily needing to repeat the onboarding process. For example, a smart thermostat, once onboarded, may automatically send temperature updates to a remote system hosted in the cloud over a period of months or years. The device configuration may influence the behavior of the device such that the device may perform one or more actions according to information specified or indicated in the device configuration. For example, the behavior of the device may include the device attempting to connect to a particular endpoint in the cloud according to an address specified in the device configuration, the device supplying access credentials to an endpoint in the cloud according to credentials specified in the device configuration, the device collecting data according to the device configuration, the device sending information (e.g., data collected by a sensor associated with the device) to an endpoint in the cloud according to the device configuration, and/or the device receiving information (e.g., modifications to the configuration information) from an endpoint in the cloud and verifying the source of the information according to the device configuration.

Figure 5:
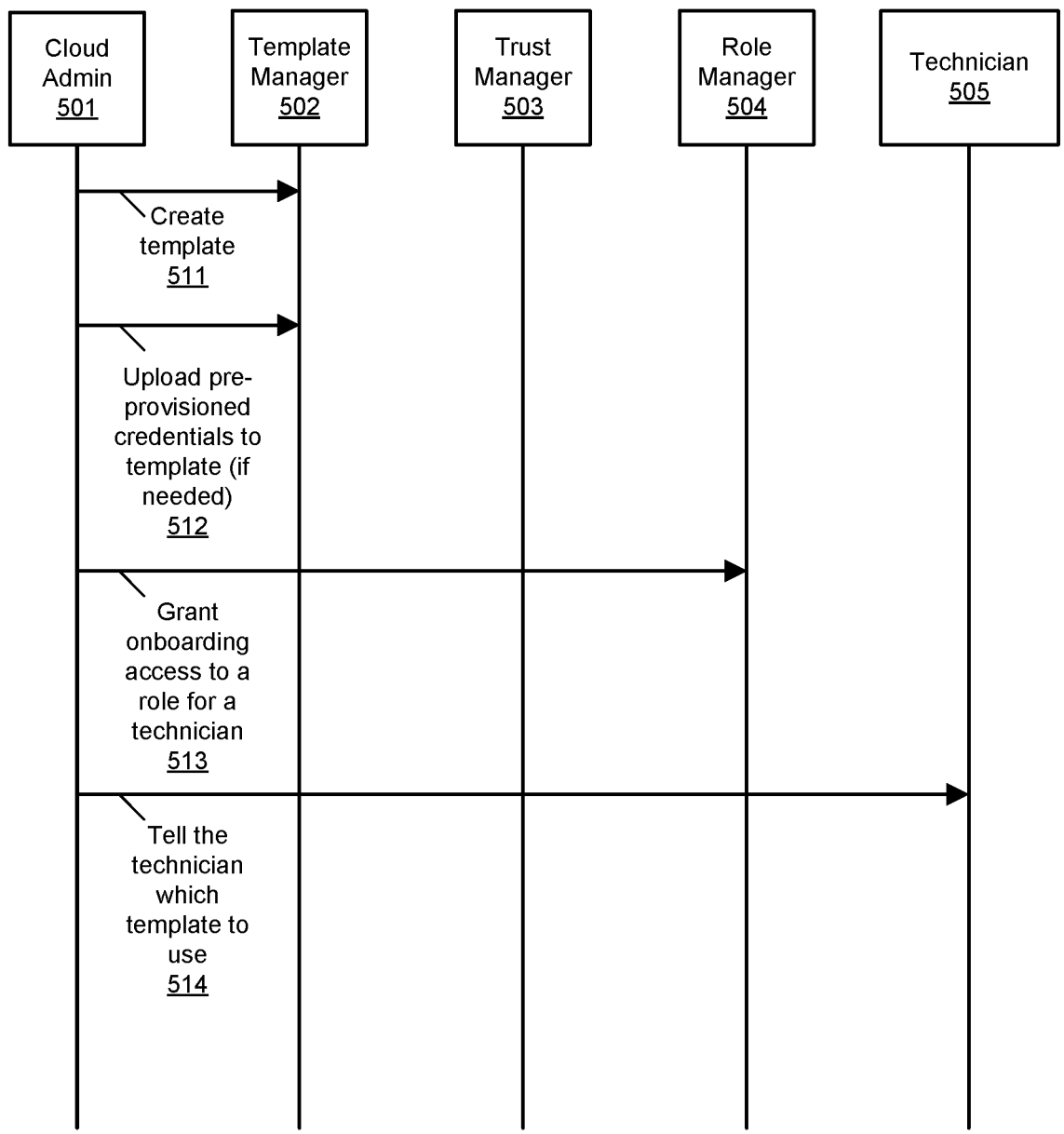
FIG. 5 is a sequence diagram representing a technique for pre-onboarding of Internet-connectible devices, according to some embodiments.

FIG. 5 is a sequence diagram representing a technique for pre-onboarding of Internet-connectible devices, according to some embodiments. The device onboarding service 100 may include components such as a template manager 502 and a trust manager 503. The template manager 502 may maintain the templates 125. The trust manager 503 may be responsible for authenticating and authorizing incoming requests from ICDs. The trust manager 503 may allow or deny onboarding of devices based on pre-defined rules, policies, conditions, and/or other criteria defined by customers. Such rules, policies, conditions, and/or criteria may be represented in an onboarding template. Additionally, the cloud computing environment 195 may include a role manager 504 that manages access credentials for users and user groups to various components of the cloud computing environment.

Prior to onboarding any devices, a cloud administrator 501 may create an onboarding template as shown in 511. The cloud administrator 501 may represent a vendor of ICDs or another entity responsible for the use of ICDs with cloud-based resources. The template may be created and/or provided to the template manager 502 using one or more APIs offered by the template manager. For example, the template manager 502 may offer APIs for listing templates, creating templates, describing templates, updating templates, deleting templates, listing template versions, and describing template versions. As shown in 512, the administrator 501 may upload pre-provisioned access credentials to the template. As shown in 513, the administrator 501 may grant onboarding access to a particular role for a technician 505 who will be installing ICDs. As shown in 513, the administrator 501 may inform the technician 505 which template to use for a particular installation or type of device.

Figure 6A:
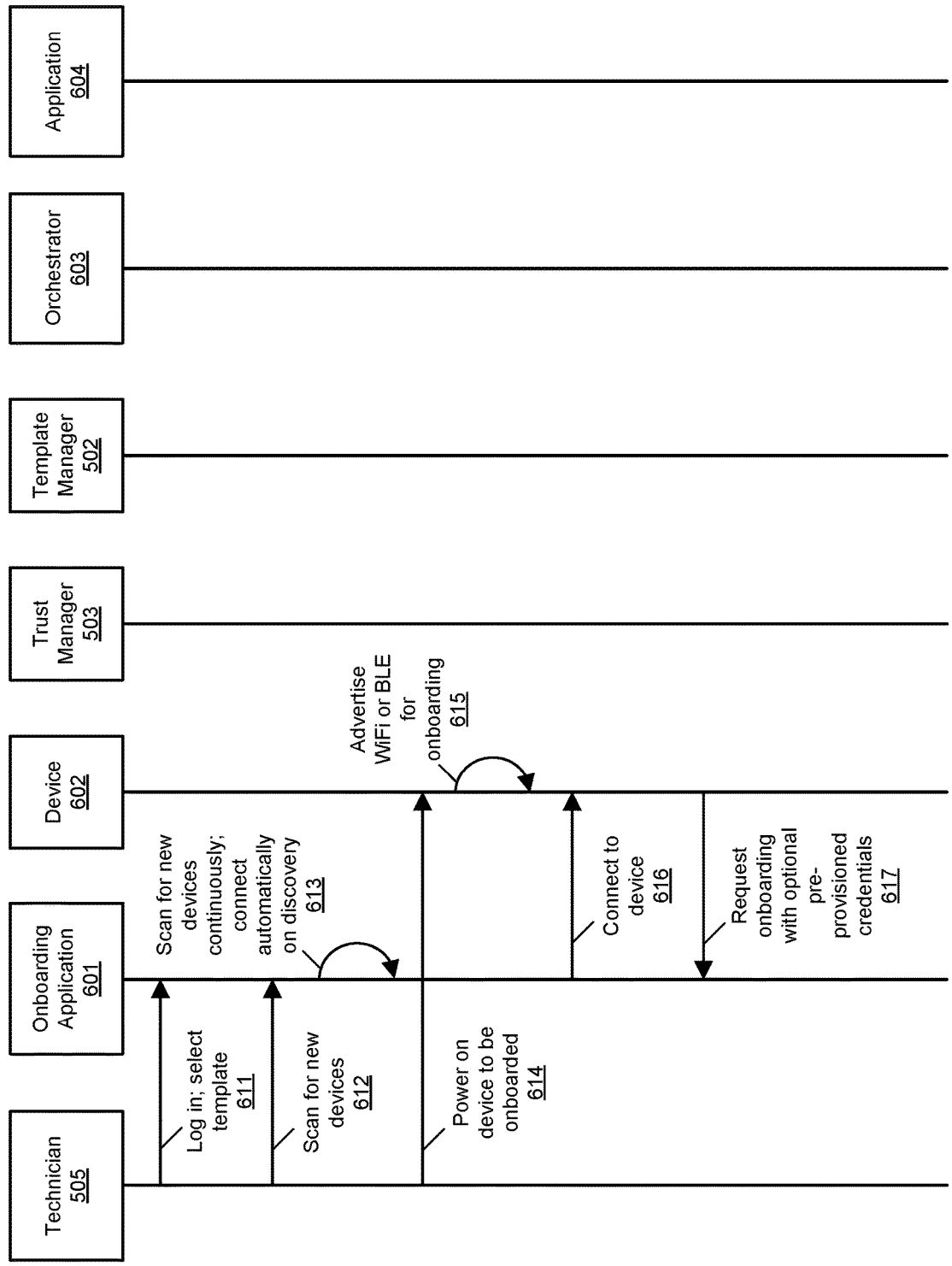
FIG. 6A, FIG. 6B, and FIG. 6C are sequence diagrams representing a technique for template-based onboarding of Internet-connectible devices, according to some embodiments.
Figure 6B:
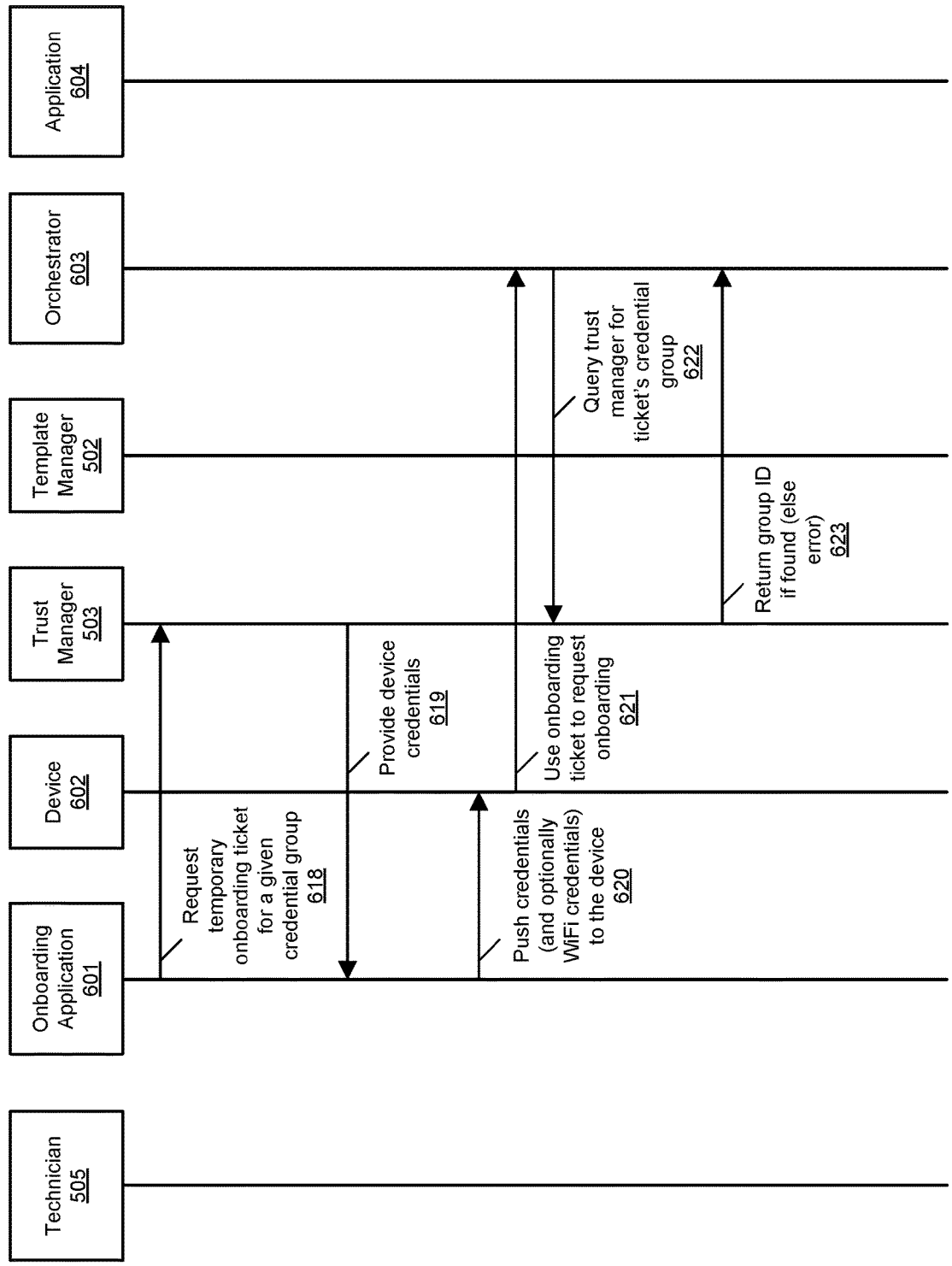
Figure 6C:
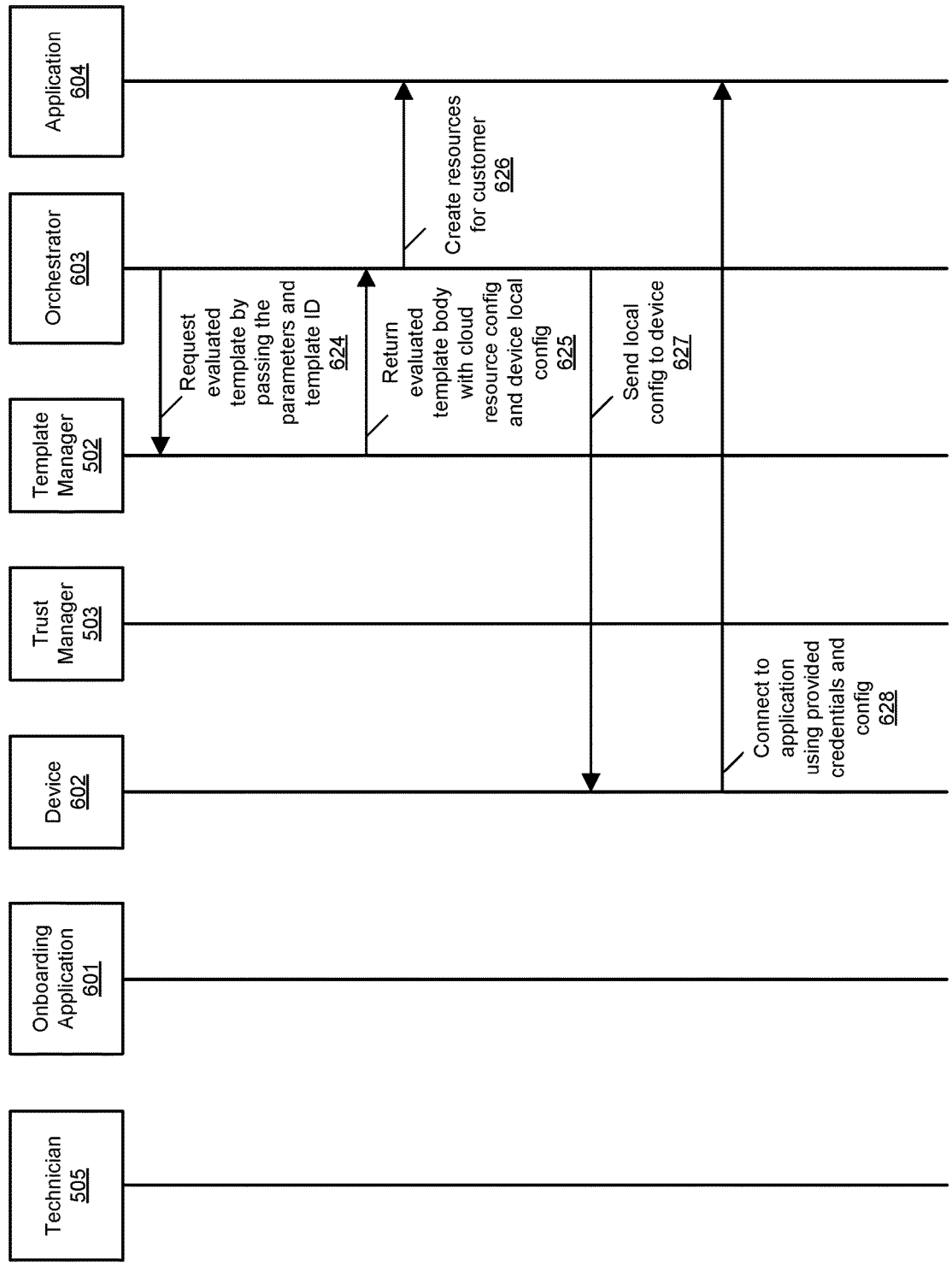

FIG. 6A, FIG. 6B, and FIG. 6C are sequence diagrams representing a technique for template-based onboarding of Internet-connectible devices, according to some embodiments. The device onboarding service 100 may include components such as an orchestrator 603. The orchestrator 603 may be responsible for processing device events and onboarding devices into an account. The account may be referred to as a customer account and may be associated with an account owner. The orchestrator 603 may represent a REST-based service that exposes application programming interfaces (APIs) for a device connector and an onboarding application 601. In one embodiment, when a device connects for onboarding, execution of a function by the serverless compute service 300 may be triggered. A device connector may be responsible for receiving onboarding requests from devices and sending configurations back to devices. The trust manager 503 may be responsible for vending onboarding tokens and performing authorization tasks. To begin onboarding to a target platform, execution of a function referred to as a cloud connector may be triggered for the serverless compute service 300. This function may interact with the template manager 502 for fetching the cloud configuration in the template and interact with an audit service to supply audit details regarding the onboarding.

The sequence diagram beginning in FIG. 6A may be used when the technician 505 seeks to install an ICD using an onboarding application 601 (e.g., an app on a mobile device operated by the technician) and not necessarily having preprovisioned credentials as in FIG. 5. As shown in 611, the technician 505 may log in and select, via the onboarding application 601, the appropriate template for installation of a particular device 602. As shown in 612, the technician 505 may instruct the application 602 to scan for new devices. As shown in 613, the application 601 may scan for new devices continuously and connect automatically to devices on discovery, e.g., via Bluetooth or another locally accessible channel. As shown in 614, the technician 505 may power on the device 602 for onboarding. As shown in 615, the device 602 may advertise itself for onboarding via WiFi or Bluetooth. As shown in 616, the onboarding application 601 may connect to the device 602. As shown in 617, the device 602 may request onboarding to the application 601 with optionally pre-provisioned credentials (e.g., for accessing WiFi or another local network).

The sequence diagram may continue in FIG. 6B. As shown in 618, the application 601 may request, to the trust manager 503, a temporary onboarding ticket for a given credential group. As shown in 619, the trust manager 503 may provide device credentials to the application 601. As shown in 620, the application 601 may push the credentials (potentially including WiFi credentials) to the device 602. As shown in 621, the device 602 may use the onboarding ticket to request onboarding from an onboarding orchestrator 603 of the device onboarding service 100. As shown in 622, the orchestrator 622 may query the trust manager 503 for the ticket's credential group. As shown in 623, the trust manager 503 may return the group ID if found or else an error.

The sequence diagram may continue in FIG. 6C. As shown in 624, the orchestrator 603 may request evaluation of the onboarding template by passing the parameters and the template ID to the template manager 502. As shown in 625, the template manager 502 may return the evaluated template body with a cloud resource configuration and a device local configuration. As shown in 626, the orchestrator may create cloud resources for the customer associated with the ICD. The cloud resources may be associated with an application 604 to which the ICD seeks to connect. As shown in 627, the orchestrator 603 may send the local configuration to the device 602. As shown in 628, the device 602 may connect to the application 604 in the cloud using the provided credentials and configuration.

As discussed above, onboarding templates may include structured documents. In one embodiment, a template may include a section for indicating a device-provided context, such as:

```
"DeviceProvidedContext": {
    "RoomNumber": {
        "Type": "String"
    },
    "Building": {
        "Type": "String",
    },
    "City": {
        "Type": "String",
        "Default": "DefaultCityName"
    }
}
```

In one embodiment, a template may include a section for indicating a user-provided context (e.g., using the onboarding application), such as:

```
"UserProvidedContext": {
    "SerialNumber": {
        "Type": "String"
    },
    "AccountId": {
        "Type": "String"
    }
}
```

In one embodiment, a template may include a section for mappings to get key-value lookups based on provided context, such as:

```
"Mappings": {
    "CityMapping": {
        "CityName1": {
            "FallbackEndpoint": "URL1"
        },
        "CityName2": {
            "FallbackEndpoint": "Url2"
        }
    }
}
```

In one embodiment, a template may include a section describing cloud resources to be created for the customer's account, such as:

```
"Resources": {
    "thing" : {
        "Type" : "CloudEnvironment::IoT::Thing",
        "Properties" : {
            "ThingName" : {"Ref" : "SerialNumber"},
            "AttributePayload" : { "version" : "v1", "accountId" : {"Ref" : "AccountId"}},
            "ThingTypeName" : "lightBulb-versionA",
            "ThingGroups" : ["v1-lightbulbs", {"Ref" : "City"}]
        },
        "OverrideSettings" : {
            "AttributePayload" : "MERGE",
            "ThingTypeName" : "REPLACE",
            "ThingGroups" : "DO_NOTHING"
        }
    },
    "certificate" : {
        "Type" : " CloudEnvironment::IoT::Certificate",
        "Properties" : {
            "CertificatePem": {"Fn::GenerateCredential": ["X.509"]},
            "Status" : "ACTIVE"
        },
        "OverrideSettings" : {
            "Status" : "DO_NOTHING"
        }
    },
    "policy" : {
        "Type" : " CloudEnvironment::IoT::Policy",
        "Properties" : {
            "PolicyDocument" : "{ \"Version\": \"2012-10-17\", \"Statement\": [{ \"Effect\": \"Allow\", \"Action\":[\"iot:Publish\"], \"Resource\": [\"ResourceIdentifier"] }] }"
        }
    }
}
```

In one embodiment, a template may include a pre-onboarding configuration section that is created by the customer account and provided to the installer, such as:

```
"PreOnboardingConfiguration": {
    "WifiSsid": "wpa2",
    "WifiPassword": "password123",
}
```

In one embodiment, a template may include a section indicating any configuration that should be sent to the device to finalize the onboarding process, such as:

```
"DeviceConfiguration": {
    "UserAccountId": {"Ref": "AccountId"},
    "AdminAccountId": "0123456789",
    "IoTEndpoint": "URL1",
    "FallbackEndpoint": {"Fn::FindInMap": ["CityMapping", {"Ref": "City"}, "FallbackEndpoint"]},
}
```

In one embodiment, a template may include a section specifying a deployment target in another region or account, such as:

```
"DeploymentTarget": {
    "OnboardingRole": "ResourceIdentifier",
    "Region": "RegionName"
}
```

In one embodiment, a template may include an attachments section for documents stored in the cloud that can be delivered to the device when onboarding is complete, such as:

```
"Attachments": {
    "wifi-cert": "DocumentLocation",
    "boot-image": "data:image/png;base64,....",
}
```

Illustrative Computer System

In at least some embodiments, a computer system that implements a portion or all of one or more of the technologies described herein may include a computer system that includes or is configured to access one or more computer-readable media. FIG. 7 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:
1. A system, comprising:
a plurality of computing devices configured to implement a device onboarding service hosted in a cloud computing environment, wherein the device onboarding service is configured to:

store an onboarding template determined at least in part by an account owner, wherein the onboarding template comprises a plurality of directives associated with onboarding of devices to the cloud computing environment, wherein the plurality of directives comprise:
  one or more criteria to verify a form of proof and context of identity (PCI) presented for Internet-connectible devices (ICDs) to be onboarded,
  an account policy indicating an identity verification technique, and
  information to generate device configurations for the ICDs including access credentials for the ICDs to communicate with an application in the cloud computing environment;
receive via a network, an onboarding request comprising a of an Internet-connectible device (ICD), wherein the PCI represents a unique identifier of the ICD;
determine an account associated with the account owner based at least in part on the onboarding request, wherein the account is associated with the account policy in the onboarding template;
access the onboarding template to:
  verify that a form of the PCI meets one or more criteria indicated in the onboarding template;
  verify the PCI using the identity verification technique indicated in the account policy in the onboarding template;
  generate a device configuration based at least in part on the onboarding template, wherein the device configuration comprises access credentials usable by the ICD;
  send the generated device configuration to the ICD, wherein a behavior of the ICD is determined based at least in part on the device configuration; and
  perform onboarding of the ICD to an application in the cloud computing environment, wherein the ICD uses the access credentials from the generated device configuration to communicate with the application via the network.

2. The system as recited in claim 1, wherein the PCI is received by the device onboarding service from an attestor device connected to the network, wherein the PCI is generated based at least in part on information from the ICD and information from the attestor device, wherein the PCI is signed by the attestor device, and wherein the device configuration is sent to the ICD via the attestor device.

3. The system as recited in claim 2, wherein the device onboarding service is further configured to:
verify that the attestor device meets one or more additional criteria indicated in the onboarding template.

4. The system as recited in claim 1, wherein the device onboarding service is further configured to:
receive, via the network, an additional onboarding request comprising an additional PCI of an additional ICD, wherein the additional PCI represents a unique identifier of the additional ICD;
determine the account associated with the account holder based at least in part on the additional onboarding request;
fail to verify that a form of the additional PCI meets the one or more criteria indicated in the onboarding template; and
disallow onboarding of the additional ICD to the application in the cloud computing environment.

5. A method, comprising:
receiving, by a device onboarding service in a computing environment via a network, a proof and context of identity (PCI) of an Internet-connectible device (ICD);
determining, by the device onboarding service, an onboarding template that comprises:
  one or more criteria for verifying the PCI, and
  information to determine a device configuration for the ICD, wherein the device configuration includes access credentials usable by the ICD to communicate with an application in the computing environment,
  wherein the onboarding template is associated with an account, and wherein the onboarding template is specified at least in part by an owner of the account;
verifying that the PCI meets the one or more criteria of the onboarding template, comprising:
  retrieving the one or more criteria from the onboarding template; and
  determining that the PCI meets the one or more retrieved criteria;
determining the device configuration based at least in part on the onboarding template, wherein the device configuration comprises the access credentials usable by the ICD; and
sending the determined device configuration to the ICD, wherein a behavior of the ICD is determined based at least in part on the determined device configuration, and wherein the ICD uses the access credentials from the determined device configuration to communicate with the application in the computing environment via the network.

6. The method as recited in claim 5, wherein the PCI is received by the device onboarding service from an attestor device connected to the network, wherein the PCI is generated based at least in part on information from the ICD and information from the attestor device, wherein the PCI is signed by the attestor device, and wherein the device configuration is sent to the ICD via the attestor device.

7. The method as recited in claim 6, further comprising:
verifying, by the device onboarding service, that the attestor device meets one or more additional criteria indicated in the onboarding template.

8. The method as recited in claim 5, further comprising:
verifying the PCI using an identity verification technique indicated in the onboarding template.

9. The method as recited in claim 5, further comprising:
receiving, by the device onboarding service via the network, an additional PCI of an additional ICD;
determining, by the device onboarding service, the onboarding template associated with the additional ICD;
failing to verify that the additional PCI meets the one or more criteria of the onboarding template; and
disallowing access by the additional ICD to the application in the computing environment.

10. The method as recited in claim 5, further comprising:
provisioning one or more resources in the computing environment based at least in part on the onboarding template, wherein the one or more resources are associated with the ICD.

11. The method as recited in claim 5, wherein context associated with the PCI comprises a location of the ICD, a serial number of the ICD, or an identifier of the account.

12. The method as recited in claim 5, further comprising:
receiving, by the device onboarding service via the network, an additional PCI of an additional ICD, wherein the additional PCI differs at least in part from the PCI;

determining, by the device onboarding service, an additional onboarding template, wherein the additional onboarding template is associated with the account, and wherein the additional onboarding template is determined at least in part by the owner of the account;
verifying that the additional PCI meets one or more criteria of the additional onboarding template;
determining an additional device configuration based at least in part on the additional onboarding template, wherein the additional device configuration comprises additional access credentials usable by the additional ICD; and
sending the additional device configuration to the additional ICD, wherein a behavior of the additional ICD is determined based at least in part on the additional device configuration, and wherein the additional ICD uses the additional access credentials to communicate with the application in the computing environment via the network.

13. One or more non-transitory computer-readable storage media storing program instructions that, when executed on or across one or more processors, perform:
receiving, by a device onboarding service in a cloud computing environment via a network, an onboarding request comprising a proof and context of identity (PCI) of an Internet-connectible device (ICD), wherein the PCI represents a unique identifier of the ICD;
determining, by the device onboarding service, an account policy in an onboarding template based at least in part on the onboarding request, wherein the onboarding template comprises:
one or more criteria,
the account policy including an indication of an identity verification technique, and
information to determine a device configuration for the ICD including to determine access credentials usable by the ICD to communicate with an application in the cloud computing environment,
wherein the onboarding template is associated with an account, and wherein the onboarding template is specified at least in part by an owner of the account;
verifying, by the device onboarding service, that the PCI meets the one or more criteria of the onboarding template, comprising:
retrieving the one or more criteria from the onboarding template; and
determining that the PCI meets the one or more retrieved criteria;
verifying the PCI using the identity verification technique indicated in the onboarding template;
determining, by the device onboarding service, the device configuration based at least in part on the onboarding template, wherein the device configuration comprises the access credentials usable by the ICD; and
sending the determined device configuration, from the device onboarding service to the ICD, wherein a behavior of the ICD is determined based at least in part on the device configuration, and wherein the ICD uses the access credentials from the determined device configuration to communicate with the application in the cloud computing environment via the network.

14. The one or more non-transitory computer-readable storage media as recited in claim 13, wherein the PCI is received by the device onboarding service from an attestor device connected to the network, wherein the PCI is generated based at least in part on information from the ICD and information from the attestor device, wherein the PCI is signed by the attestor device, and wherein the device configuration is sent to the ICD via the attestor device.

15. The one or more non-transitory computer-readable storage media as recited in claim 14, further comprising additional program instructions that, when executed on or across the one or more processors, perform:
verifying, by the device onboarding service, that the attestor device meets one or more additional criteria indicated in the onboarding template.

16. The one or more non-transitory computer-readable storage media as recited in claim 13, further comprising additional program instructions that, when executed on or across the one or more processors, perform:
receiving, by the device onboarding service via the network, an additional onboarding request comprising an additional PCI of an additional ICD;
determining, by the device onboarding service, the account policy associated with the additional ICD based at least in part on the additional onboarding request;
failing to verify, by the device onboarding service, that the additional PCI meets the one or more criteria of the onboarding template; and
disallowing access by the additional ICD to the application in the cloud computing environment.

17. The one or more non-transitory computer-readable storage media as recited in claim 13, wherein the PCI is received by the device onboarding service from the ICD after the ICD is connected to the network.

18. The one or more non-transitory computer-readable storage media as recited in claim 13, further comprising additional program instructions that, when executed on or across the one or more processors, perform:
receiving, by the device onboarding service via the network, an additional onboarding request comprising an additional PCI of an additional ICD, wherein the additional PCI differs at least in part from the PCI;
determining, by the device onboarding service, an additional account policy in an additional onboarding template based at least in part on the additional onboarding request, wherein the additional onboarding template is associated with the account, and wherein the additional onboarding template is determined at least in part by the owner of the account;
verifying, by the device onboarding service, that the additional PCI meets one or more criteria of the additional onboarding template;
determining, by the device onboarding service, an additional device configuration based at least in part on the additional onboarding template, wherein the additional device configuration comprises additional access credentials usable by the additional ICD; and
sending the additional device configuration from the device onboarding service to the additional ICD, wherein a behavior of the additional ICD is determined based at least in part on the additional device configuration, and wherein the additional ICD uses the additional access credentials to communicate with an additional application in the centralized computing environment via the network.

19. The one or more non-transitory computer-readable storage media as recited in claim 13, wherein context associated with the PCI comprises information usable to identify the account, and wherein the account policy is determined using the identifier of the account.

20. The one or more non-transitory computer-readable storage media as recited in claim 13, wherein the account is determined by the device onboarding service without receiving an identifier of the account from the ICD or from an attestor device.

\* \* \* \* \*